United States Patent [19]

Betensky et al.

[11] Patent Number: 4,526,442
[45] Date of Patent: * Jul. 2, 1985

[54] COMPACT PROJECTION LENS

[75] Inventor: Ellis I. Betensky, New York, N.Y.

[73] Assignee: U.S. Precision Lens, Inc., Cincinnati, Ohio

[*] Notice: The portion of the term of this patent subsequent to Sep. 7, 1999 has been disclaimed.

[21] Appl. No.: 280,785

[22] Filed: Jul. 6, 1981

Related U.S. Application Data

[63] Continuation-in-part of Ser. No. 228,012, Jan. 28, 1981, Pat. No. 4,348,081, which is a continuation-in-part of Ser. No. 070,748, Sep. 4, 1979, Pat. No. 4,300,817, which is a continuation-in-part of Ser. No. 940,724, Sep. 6, 1978, abandoned.

[51] Int. Cl.³ .................. G02B 9/12; G02B 13/18; G02B 27/18
[52] U.S. Cl. .................. 350/412; 350/432; 350/445; 350/477
[58] Field of Search ............... 350/412, 445, 474, 477, 350/432–435

[56] References Cited

U.S. PATENT DOCUMENTS

| | | | |
|---|---|---|---|
| 2,440,088 | 4/1948 | Grey | 350/453 |
| 2,552,672 | 5/1951 | Grey | 350/432 |
| 2,638,034 | 5/1953 | Wreathall | 350/432 |
| 2,660,094 | 11/1953 | Wreathall | 350/432 |
| 2,737,849 | 3/1956 | Tiller | 350/464 |
| 3,429,997 | 2/1969 | Rosner et al. | 350/438 |
| 3,800,085 | 3/1974 | Ambats et al. | 350/420 |
| 3,868,173 | 1/1975 | Miles et al. | 350/464 |
| 3,951,523 | 4/1976 | Nishimoto | 350/432 |
| 3,998,527 | 12/1976 | Ikeda et al. | 350/432 |
| 4,232,943 | 11/1980 | Rogers | 350/445 |
| 4,300,817 | 11/1981 | Betensky | 350/412 |
| 4,348,081 | 9/1982 | Betensky | 350/412 |

FOREIGN PATENT DOCUMENTS 593514 10/1947 United Kingdom ............... 123/239

Primary Examiner—John K. Corbin
Assistant Examiner—Scott J. Sugarman
Attorney, Agent, or Firm—Costas, Montgomery & Dorman

[57] ABSTRACT

A compact projection lens for a cathode ray tube comprises from the image end, a first group of positive power which corrects aperture dependent aberrations, a second positive group and a third group which corrects for field curvature and distortion. A mirror is inserted between the first and second groups to fold the optical axis.

27 Claims, 2 Drawing Figures

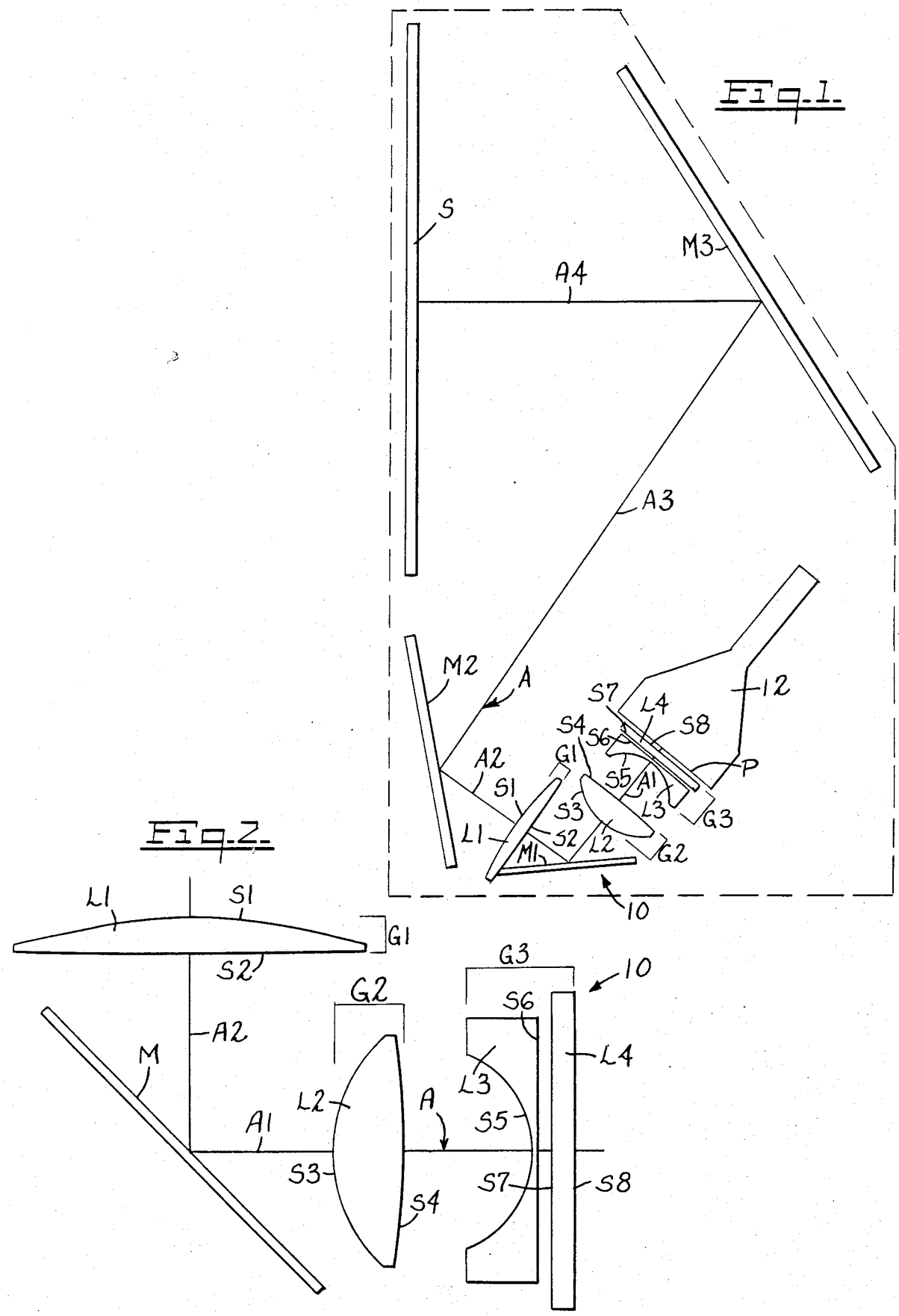

COMPACT PROJECTION LENS

RELATED APPLICATIONS

This application is a continuation-in-part of application Ser. No. 228,012 filed Jan. 28, 1981, now U.S. Pat. No. 4,348,081, which is a continuation-in-part of application Ser. No. 070,748 filed Sept. 4, 1979, now U.S. Pat. No. 4,300,817, which in turn is a continuation-in-part of application Ser. No. 940,724 filed Sept. 6, 1978, now abandoned, the disclosures of which applications are incorporated herein by reference.

BACKGROUND OF THE INVENTION

This invention relates to a projection lens, and more particularly, relates to a lens adapted to project an enlargement of an image appearing on a cathode ray tube (CRT) such as a screen of a television set.

Co-pending application Ser. No. 070,748 now U.S. Pat. No. 4,300,817 discloses a lens which comprises from the image end a first group which is an aperture dependent aberration corrector element of essentially no optical power, a second positive group providing essentially all of the positive power of the lens, and a third group which corrects for field curvature, and in some cases, distortion. The optical power of the first group as a ratio to unity power of the overall lenses is between 0.1 and 0.4.

Co-pending application Ser. No. 228,012 now U.S. Pat. No. 4,348,081 discloses a lens comprising from the image end a first group of positive power which also corrects aperture dependent aberrations, a second positive group, and a third group which corrects for field curvature, and in some cases, distortion. The powers of the groups K1, K2, and K3 are chosen in a range related to unity power of the overall lens as follows:

$0.25 < K1 < 0.50$ $0.85 < K2 < 1.2$ $-1.3 < K3 < -0.9$

In addition the elements of the groups may also have aspheric surfaces.

The present invention is a new and improved projection lens which is capable of providing a more compact lens than the projection lenses of the co-pending applications. The degree of compactness is accomplished in part by the internal folding of the optical axis of the projection lens.

SUMMARY OF THE INVENTION

Briefly stated, the present invention comprises from the image end, a first group of positive power which also corrects aperture dependent aberrations, a second positive group, and a third group which corrects for field curvature, and in some cases, distortion. The powers of the groups K1, K2, and K3 are chosen in a range related to unity power of the overall lens as follows:

$0.25 < K1 < 0.50$ $0.85 < K2 < 1.20$ $-1.4 < K3 < -0.9$

A folding means, which may be in the form of a plano mirror, is inserted between the first and second groups to fold the optical axis. The axial spacing between the surfaces of the first and second group is on the order of the EFL of the overall lens. Some of the surfaces of the elements are also aspheric.

An object of this invention is to provide a new and improved compact projection lens for a CRT.

Another object of this invention is to provide a new and improved projection lens for a CRT which maintains good aberration correction and relative illumination.

Other objects of this invention will become apparent from the detailed description and accompanying drawings.

BRIEF DESCRIPTION OF THE DRAWINGS

FIG. 1 illustrates a side elevation of a general lens form embodying the invention in conjunction with a CRT, a plurality of means for folding the optical axis and an image screen; and FIG. 2 illustrates a side elevation of a general lens form embodying the invention.

DETAILED DESCRIPTION

A lens embodying the invention, shown generally as 10, comprises three lens groups, G1, G2, and G3 from the image end to the object end thereof. In the simplest form of the invention, each group comprises a single element as shown in FIGS. 1 and 2. The lens elements are designated by L followed by a numeral indicating the sequential position of the element from the image end to the object end of the lens. The surfaces of the respective elements are designated by S followed by a numeral indicating the sequential position of the surface from the image end to the object end of the lens.

With further reference to FIG. 2, Group G1 comprises an element L1 of positive optical power having surfaces S1 and S2. Element L1 corrects for aperture dependent aberrations, as well as providing for some of the overall positive power of the lens. Either surface S1 or surface S2 may be aspheric.

The optical axis of the lens system is designated by A. The present invention comprises an internal folding of the optical axis to form optical axis segments A1 and A2 as shown in FIG. 2.

Group G2 comprises a single element L2 having surfaces S3 and S4. Element L2 is a bi-convex element of positive optical power. Together, element L2 and element L1 provide essentially all of the positive power of the overall lens. Surfaces S3 and S4 may be aspheric.

With further reference to FIG. 2, the optical axis segments A1 and A2 traversing through elements L1 and L2 are at substantially right angles to each other. The internal folding of the optical axis is accomplished by a folding means M which is preferably in the form of a plano-mirror positioned between elements L1 and L2. An important design constraint in providing for the compact lens format of the present invention is the requisite provision of sufficient axial distance between element L1 and element L2 to allow for insertion of a folding means. While it is necessary to provide sufficient air space between elements L1 and L2 to insert a mirror or means to fold the optical axis, the axial distance between elements L1 and L2 should not be too large so that the desirable object of providing a compact lens system is not unduly compromised. An additional design consideration which results from employing a mirror between elements L1 and L2 is that of providing sufficient illumination at the periphery of the image. In conjunction with the latter considerations, it is desirable that the element L1 not become too large. It is found that a relationship for achieving a suitable compact projection lens can be accomplished when the axial distance along the optical axis between elements L1 and L2 is on the order of the EFL of the overall lens, as set forth in Table IV below.

Group G3 comprises element L3 which is an element of negative optical power with a concave image side surface S5. In one form, the image side surface S5 is aspheric and the object side surface S6 is plano. Element L3 serves as a field flattener which essentially corrects the Petzval curvature of the elements in groups G1 and G2.

Element L4 is a radiation shield usually used with a monochromatic CRT projection system and does not comprise any portion of the projection lens. The surface of the CRT shown generally as 12 is designated P. Element L4 has two plano surfaces S7 and S8 and contributes no optical power to the lens.

A lens embodying the invention preferably has lenses having one or more aspheric surfaces as previously described and as will be made apparent from the examples in the following tables. The aspheric surfaces may be defined by the following equation:

$$X = \frac{Cy^2}{1 + \sqrt{1 - (1 + k) C^2 y^2}} + Dy^4 + Ey^6 + Fy^8 + Gy^{10}$$

Where X is the surface sag at a semi-aperture distance y from the axis A of the lens, C is the curvature of the lens surface at the optical axis A equal to the reciprocal of the radius at the optical axis, k is a conic constant and D, E, F and G are constants.

With reference to FIG. 1, the compact projection lens 10 is illustrated in conjunction with a CRT 12 and an image screen S. The dashed lines schematically indicate the exterior dimensions of a television console or similar apparatus. In the drawing of FIG. 2, the optical axis A extending from CRT 12 to the image screen S is folded three times by means of mirrors M1, M2, and M3 to form optical axis segments A1, A2, A3, and A4. The optical axis may be folded to form axis segments of various angular relationships. It is preferred that the fold between elements L1 and L2 be substantially ninety degrees although other angular relationships are within the scope of the invention. As can be ascertained from FIG. 2, the compact lens 10, when employed in conjunction with a CRT and a plurality of additional means for folding the optical axis may, by suitable positioning and judicious folding of the optical axis, provide for a substantially more compact television or projection system.

The following examples in Tables I, II and III are exemplary of lenses embodying the invention which are useful primarily for monochromatic CRT's and are not color corrected. The lenses of Tables I, II and III have aspheric surfaces defined by the foregoing aspheric equation. In the tables, the surface radius for the surface denoted by S followed by the surface number is the radius at the optical axis, $N_d$ is the index of refraction and $V_d$ is the Abbe number. Positive surface radii are struck from the right and negative radii are struck from the left. The object is to the right at the surface of the CRT. A radiation shield L4 is generally present but is a consideration which is not an important factor in the overall lens design. In the tables, the relative aperture is measured from the short conjugate.

In each of the examples of Tables I, II, and III, a means for folding the optical axis is inserted between elements L1 and L2 which results in the optical axis being folded at substantially a 90° angle.

TABLE I

A lens as shown in FIG. 2 scaled to an EFL of 116.5 mm and relative aperture of f/1.0 is described substantially as follows:

|   | Surface | Surface Radius (mm) | Axial Distance Between Surfaces (mm) | $N_d$ | $V_d$ |
|---|---|---|---|---|---|
| L1 | S1 | 201.04 | | | |
|  |  |  | 16.00 | 1.492 | 57.1 |
|  | S2 | −6569.50 | | | |
|  |  |  | 114.00 | | |
| L2 | S3 | 68.36 | | | |
|  |  |  | 32.50 | 1.492 | 57.1 |
|  | S4 | −198.13 | | | |
|  |  |  | 57.58 | | |
| L3 | S5 | −43.66 | | | |
|  |  |  | 3.00 | 1.492 | 57.1 |
|  | S6 | −5397.88 | | | |
|  |  |  | 6.00 | | |

Aspheric surfaces: S1, S4, S5

|   | S1 | S4 | S5 |
|---|---|---|---|
| D | −.1316 × 10$^{-6}$ | .3056 × 10$^{-6}$ | −.6240 × 10$^{-5}$ |
| E | .8734 × 10$^{-11}$ | .6813 × 10$^{-10}$ | .1576 × 10$^{-8}$ |
| F | −.2910 × 10$^{-14}$ | −.4657 × 10$^{-13}$ | .3861 × 10$^{-12}$ |
| G | .1959 × 10$^{-18}$ | .8216 × 10$^{-17}$ | −.4809 × 10$^{-15}$ |
| k | 1.326 | −5.183 | −5.599 |

Where L1–L3 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4, and S5 are aspheric. A means for folding the optical axis is positioned between elements L1 and L2.

TABLE II

A lens as shown in FIG. 2 scaled to an EFL of 117.4 mm and relative aperature of f/1.0 is described substantially as follows:

|   | Surface | Surface Radius (mm) | Axial Distance Between Surfaces (mm) | $N_d$ | $V_d$ |
|---|---|---|---|---|---|
| L1 | S1 | 167.81 | | | |
|  |  |  | 16.00 | 1.492 | 57.1 |
|  | S2 | 1230.59 | | | |
|  |  |  | 114.00 | | |
| L2 | S3 | 68.56 | | | |
|  |  |  | 30.69 | 1.492 | 57.1 |
|  | S4 | −207.25 | | | |
|  |  |  | 58.65 | | |
| L3 | S5 | −47.89 | | | |
|  |  |  | 3.00 | 1.492 | 57.1 |
|  | S6 | ∞ | | | |
|  |  |  | 6.00 | | |

Aspheric surfaces: S2, S4, S5,

|   | S2 | S4 | S5 |
|---|---|---|---|
| D | .1194 × 10$^{-6}$ | .3971 × 10$^{-6}$ | .1488 × 10$^{-5}$ |
| E | −.1066 × 10$^{-10}$ | .2482 × 10$^{-10}$ | −.1112 × 10$^{-8}$ |
| F | .2273 × 10$^{-14}$ | −.2710 × 10$^{-13}$ | .1395 × 10$^{-11}$ |
| G | −.7673 × 10$^{-19}$ | .4807 × 10$^{-17}$ | −.6276 × 10$^{-15}$ |
| k | −1.000 | −1.000 | −1.000 |

Where L1–L3 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S2, S4 and S5 are aspheric. A means for folding the optical axis is positioned between elements L1 and L2.

TABLE III

A lens as shown in FIG. 2 scaled to and EFL of 116.6 mm and relative aperture of f/1.0 is described substantially as follows:

|    |    | Surface Radius (mm) | Axial Distance Between Surfaces (mm) | $N_d$ | $V_d$ |
|----|----|---------------------|--------------------------------------|-------|-------|
| L1 | S1 | 201.71              |                                      |       |       |
|    |    |                     | 16.00                                | 1.492 | 57.1  |
|    | S2 | ∞                   |                                      |       |       |
|    |    |                     | 114.00                               |       |       |
| L2 | S3 | 68.84               |                                      |       |       |
|    |    |                     | 32.50                                | 1.492 | 57.1  |
|    | S4 | −196.58             |                                      |       |       |
|    |    |                     | 58.85                                |       |       |
| L3 | S5 | −44.84              |                                      |       |       |
|    |    |                     | 3.00                                 | 1.492 | 57.1  |
|    | S6 | ∞                   |                                      |       |       |
|    |    |                     | 6.00                                 |       |       |

Aspheric surfaces: S1, S3, S4, and S5

|   | S1 | S3 | S4 | S5 |
|---|----|----|----|----|
| D | $-.1284 \times 10^{-6}$ | $-.2543 \times 10^{-7}$ | $.2749 \times 10^{-6}$ | $-.5975 \times 10^{-5}$ |
| E | $.7793 \times 10^{-11}$ | $.2858 \times 10^{-11}$ | $.7423 \times 10^{-10}$ | $.1467 \times 10^{-8}$ |
| F | $-.2784 \times 10^{-14}$ | $-.4865 \times 10^{-16}$ | $-.4456 \times 10^{-13}$ | $.3204 \times 10^{-12}$ |
| G | $.1840 \times 10^{-18}$ | $-.1098 \times 10^{-18}$ | $.7464 \times 10^{-17}$ | $-.4199 \times 10^{-15}$ |
| k | 1.326 | .0001 | −5.183 | −5.599 |

Where L1–L3 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S3, S4, and S5 are aspheric. A means for folding the optical axis is positioned between elements L1 and L2.

Table IV sets forth the powers K of the groups of the lenses of Table I, II, and III as a ratio to the focal length of the overall lens.

TABLE IV

|           | K1  | K2   | K3    |
|-----------|-----|------|-------|
| Table I   | .29 | 1.09 | −1.31 |
| Table II  | .30 | 1.08 | −1.21 |
| Table III | .29 | 1.08 | −1.29 |

Where K1 is the power of the first group, K2 is the power of the second group, and K3 is the power of the third group. The power of the overall lens is designated as unity. A lens embodying the invention as shown by Table IV has group powers as a ratio of the power of the overall lens as follows:

$0.25 < K1 < 0.50$ $0.85 < K2 < 1.2$ $-1.4 < K3 < -0.9$

Table V sets forth the axial spacing along the optical axis between the surfaces of the first and second group, the equivalent focal length of the overall lens and the ratio of the axial spacing between the surfaces of the first and second groups to the focal length of the overall lens for the lenses as set forth in Tables I, II and III.

TABLE V

|           | D     | EFL   | D/EFL |
|-----------|-------|-------|-------|
| Table I   | 114.0 | 116.5 | .98   |
| Table II  | 114.0 | 117.4 | .97   |
| Table III | 114.0 | 116.6 | .98   |

Where D is the axial spacing along the optical axis between the surfaces of groups G1 and G2, and EFL is the equivalent focal length of the overall lens.

It can be seen from the foregoing Table V that the ratio of the axial distance along the optical axis between the surfaces of groups G1 and G2 to the equivalent focal length of the overall lens is on the order of unity.

It may thus seen that the objects of the invention set forth as well as those made apparent from the foregoing description are efficiently attained. While preferred embodiments have been set forth for purposes of disclosure, modifications of the disclosed embodiments of the invention as well as other embodiments thereof may occur to those skilled in the art. Accordingly, the intended claims are intended to cover all the embodiments of the invention and modifications to the disclosed embodiments which do not depart from the spirit and scope of the invention.

What is claimed is:

1. A projection lens for a cathode ray tube display, said lens consisting of three groups from the image end to the object end, as follows:
    a first group comprising an element of relatively weak optical power having at last one aspheric surface;
    a second positive group air spaced from said first group providing substantially all the positive power of said lens;
    a third group air spaced from said second group and comprising a negative element having a surface concave to the image end and serving as a field flattener essentially correcting the Petzval curvature of the first and second groups;
wherein said three groups have optical powers K1, K2, and K3, the overall lens has an optical power of 1.0, and $0.25 < K1 < 0.50$, $0.85 < K2 < 1.20$, $$-1.4 < K3 < -0.9$$

2. A lens according to claim 1 having aspheric surfaces wherein each aspheric lens surface is defined by the following relationship:

$$X = \frac{Cy^2}{1 + \sqrt{1 - (1 + k) C^2 y^2}} + Dy^4 + Ey^6 + Fy^8 + Gy^{10}$$

where X is the surface sag at a semi-aperture distance y from the optical axis of the lens, C is the curvature of the lens surface of the optical axis A equal to the reciprocal of the radius of the lens at the optical axis, k is a conic constant, D, E, F, and G are constants.

3. A lens according to claim 2 scaled to an EFL of 116.5 mm and relative aperture of f/1.0 described substantially as follows:

|  |  | Surface Radius (mm) | Axial Distance Between Surfaces (mm) | $N_d$ | $V_d$ |
|---|---|---|---|---|---|
| L1 | S1 | 201.04 |  |  |  |
|  |  |  | 16.00 | 1.492 | 57.1 |
|  | S2 | −6569.50 |  |  |  |
|  |  |  | 114.00 |  |  |
| L2 | S3 | 68.36 |  |  |  |
|  |  |  | 32.50 | 1.492 | 57.1 |
|  | S4 | −198.13 |  |  |  |
|  |  |  | 57.58 |  |  |
| L3 | S5 | −43.66 |  |  |  |
|  |  |  | 3.00 | 1.492 | 57.1 |
|  | S6 | −5397.88 |  |  |  |
|  |  |  | 6.00 |  |  |

Aspheric surfaces: S1, S4, S5

| | S1 | S4 | S5 |
|---|---|---|---|
| D | −.1316 × 10$^{-6}$ | .3056 × 10$^{-6}$ | −.6240 × 10$^{-5}$ |
| E | .8734 × 10$^{-11}$ | .6813 × 10$^{-10}$ | .1576 × 10$^{-8}$ |
| F | −.2910 × 10$^{-14}$ | −.4657 × 10$^{-13}$ | .3861 × 10$^{-12}$ |
| G | .1959 × 10$^{-18}$ | .8216 × 10$^{-17}$ | −.4809 × 10$^{-15}$ |
| C | 1.326 | −5.183 | −5.599 |

Where L1-L3 are successive lens elements from the image end, S1-S6 are successive element surfaces, the surface radii where positive are surfaces convex to the image end and where negative are concave to the image end, $N_d$ is the index of refraction of the lens elements, $V_d$ is the dispersion of the lens elements measured by the Abbe number, and surfaces S1, S4, and S5 are aspheric.

4. A lens according to claim 2 scaled to an EFL of 117.4 mm and relative aperture of f/1.0 is described substantially as follows:

|  |  | Surface Radius (mm) | Axial Distance Between Surfaces (mm) | $N_d$ | $V_d$ |
|---|---|---|---|---|---|
| L1 | S1 | 167.81 |  |  |  |
|  |  |  | 16.00 | 1.492 | 57.1 |
|  | S2 | 1230.59 |  |  |  |
|  |  |  | 114.00 |  |  |
| L2 | S3 | 68.56 |  |  |  |
|  |  |  | 30.69 | 1.492 | 57.1 |
|  | S4 | −207.25 |  |  |  |
|  |  |  | 58.65 |  |  |
| L3 | S5 | −47.89 |  |  |  |
|  |  |  | 3.00 | 1.492 | 57.1 |
|  | S6 |  |  |  |  |
|  |  |  | 6.00 |  |  |

Aspheric surfaces: S2, S4, S5

| | S2 | S4 | S5 |
|---|---|---|---|
| D | .1194 × 10$^{-6}$ | .3971 × 10$^{-6}$ | .1488 × 10$^{-5}$ |
| E | −.1066 × 10$^{-10}$ | .2482 × 10$^{-10}$ | −.1112 × 10$^{-8}$ |
| F | .2273 × 10$^{-14}$ | −.2710 × 10$^{-13}$ | .1395 × 10$^{-11}$ |
| G | −.7673 × 10$^{-19}$ | .4807 × 10$^{-17}$ | −.6276 × 10$^{-15}$ |
| C | −1.000 | −1.000 | −1.000 |

Where L1-L3 are successive lens elements from the image end, S1-S6 are successive element surfaces, the surface radii where positive are surfaces convex to the image end and where negative are concave to the image end, $N_d$ is the index of refraction of the lens elements, $V_d$ is the dispersion of the lens elements measured by the Abbe number, and surfaces S2, S4 and S5 are aspheric.

5. A lens according to claim 2 scaled to an EFL of 116.6 mm and relative aperture of f/1.0 is described substantially as follows:

|  |  | Surface Radius (mm) | Axial Distance Between Surfaces (mm) | $N_d$ | $V_d$ |
|---|---|---|---|---|---|
| L1 | S1 | 201.71 |  |  |  |
|  |  |  | 16.00 | 1.492 | 57.1 |
|  | S2 |  |  |  |  |
|  |  |  | 114.00 |  |  |
| L2 | S3 | 68.84 |  |  |  |
|  |  |  | 32.50 | 1.492 | 57.1 |
|  | S4 | −196.58 |  |  |  |
|  |  |  | 58.85 |  |  |
| L3 | S5 | −44.84 |  |  |  |
|  |  |  | 3.00 | 1.492 | 57.1 |
|  | S6 |  |  |  |  |
|  |  |  | 6.00 |  |  |

Aspheric surfaces: S1, S3, S4, and S5

| | S1 | S3 | S4 | S5 |
|---|---|---|---|---|
| D | −.1284 × 10$^{-6}$ | −.2543 × 10$^{-7}$ | .2749 × 10$^{-6}$ | −.5975 × 10$^{-5}$ |
| E | .7793 × 10$^{-11}$ | .2858 × 10$^{-11}$ | .7423 × 10$^{-10}$ | .1478 × 10$^{-8}$ |
| F | −.2784 × 10$^{-14}$ | −.4865 × 10$^{-16}$ | −.4456 × 10$^{-13}$ | .3204 × 10$^{-12}$ |
| G | .1840 × 10$^{-18}$ | −.1098 × 10$^{-18}$ | .7464 × 10$^{-17}$ | −.4199 × 10$^{-15}$ |
| C | 1.326 | .0001 | −5.183 | −5.599 |

Where L1-L3 are successive lens elements from the image end, S1-S6 are successive element surfaces, the surface radii where positive are surfaces convex to the image end and where negative are concave to the image end $N_d$ is the index of refraction of the lens elements, $V_d$ is the dispersion of the lens elements measured by the Abbe number, and surfaces S1, S3, S4, and S5 are aspheric.

6. A projection lens for a cathode ray tube display, said lens consisting of three groups from the image end to the object end, as follows:

a first group comprising an element of relatively weak optical power having an aspheric surface and serving to correct aperture dependent aberrations;

a second positive group air spaced from said first group and providing substantially all the positive power of said lens and comprising a biconvex element;

a third group air spaced from said second group and comprising a negative element having an image side surface concave to the image end of strong negative power and a substantially plano object side surface, said third group essentially correcting the Petzval curvature of said first and second groups;

said three groups have optical powers K1, K2, and K3, the overall lens has an optical power of 1.0, and $0.25 < K_1 < 0.50,$ $0.85 < K_2 < 1.20,$ $-1.40 < K_3 < -0.9$ 7. A lens as defined in claims 1 or 6, wherein the concave surface is aspheric.

8. A projection lens for a cathode ray tube display consisting from the image end of three groups as follows:

a first group of relatively weak optical power comprising an element having at least one aspheric surface and serving primarily to correct aperture dependent aberrations, a second positive group air spaced from said first group providing substantially all of the positive power of said lens, and a third negative group air spaced from said second group comprising an element having a concave image side surface and serving as a field flattener essentially correcting the Petzval curvature of the elements of said first and second groups, said lens having an optical power of 1.0 and $0.85 < K_2 < 1.20$ $-1.4 < K_3 < -0.9$ where $K_2$ and $K_3$ are the optical powers of said second and third groups, respectively.

9. The lens of claim 8 where the image and object side surfaces of said second group are bi-convex.

10. The lens of claim 8 where said concave surface of said element of said third group is aspheric.

11. The lens of claim 8 where $0.25 < K_1 < 0.5$ where $K_1$ is the optical power of said first group.

12. The lens of claim 8 where said first group consists of a single element.

13. A projection lens for a cathode ray tube display consisting of three optical groups, said groups from the image end comprising a first group serving to correct aperture dependent aberrations, said first group having at least one aspheric surface, a second group of strong positive power air spaced from said first group and having biconvex object and image side surfaces, and a third group of negative optical power having an aspheric surface concave to the image end and air spaced from said second group, said third group serving as a field flattener and essentially correcting the Petzval curvature of the elements of said first and second groups, said lens having an optical power of 1.0 and $0.85 < K_2 < 1.20$ $-1.4 < K_3 < -0.9$ where $K_2$ and $K_3$ are the optical powers of said second and third groups, respectively.

14. The lens of claim 13 where said first and second groups are air spaced a substantial percentage of the equivalent focal length of said lens.

15. The lens of claim 13 where said first and second groups are air spaced more than 0.9 of the equivalent focal length of said lens.

16. The lens of claim 13 where said second group consists of a biconvex element.

17. The lens of claim 13 where said first group consists of a single element.

18. A projection lens for a cathode ray tube display consisting of three optical groups, said groups from the image end comprising a first group serving to correct aperture dependent aberrations, said first group consisting of a single element having at least one aspheric surface, a second group of strong positive power air spaced from said first group and a third group of negative optical power having an aspheric surface concave to the image end and air spaced from said second group, said third group serving as a field flattener and essentially correcting the Petzval curvature of the elements of said first and second groups, said lens having an optical power of 1.0 and $0.85 < K_2 < 1.20$ $-1.4 < K_3 < -0.9$ where $K_2$ and $K_3$ are the optical powers of said second and third groups, respectively.

19. The lens of claim 18 where said first and second groups are air spaced a substantial percentage of the equivalent focal length of said lens.

20. The lens of claim 18 where the air spacing between said first and second groups is at least 0.9 of the equivalent focal length of said lens.

21. The lens of claim 18 where said second group has biconvex object and image side surfaces.

22. The lens of claim 18 where said second group has biconvex image and object side surfaces.

23. The lens of claim 22 where said second group comprises a single element.

24. A projection lens for a cathode ray tube display consisting of three optical groups, said groups from the image end comprising a first group serving to correct aperture dependent aberrations, said first group consisting of a single element, a second group of strong positive power air spaced from said first group and having biconvex object and image side surfaces, said second group being of substantially greater optical power than said first group, and a third group of negative optical power having a surface concave to the image end and air spaced from said second group and serving as a field flattener and essentially correcting the Petzval curvature of the elements of said first and second groups, said lens having an optical power of 1.0 and $0.85 < K_2 < 1.20$ $$-1.4 < K_3 < -0.9$$

where $K_2$ and $K_3$ are the optical powers of said second and third groups, respectively.

25. The lens of claim 24 where said first and second groups are air spaced a substantial percentage of the equivalent focal length of said lens.

26. The lens of claim 24 where the air spacing between said first and second groups is at least 0.9 of the equivalent focal length of said lens.

27. The lens of claim 24 where said second group consists of a single element.

* * * * *